United States Patent Office 3,284,282
Patented Nov. 8, 1966

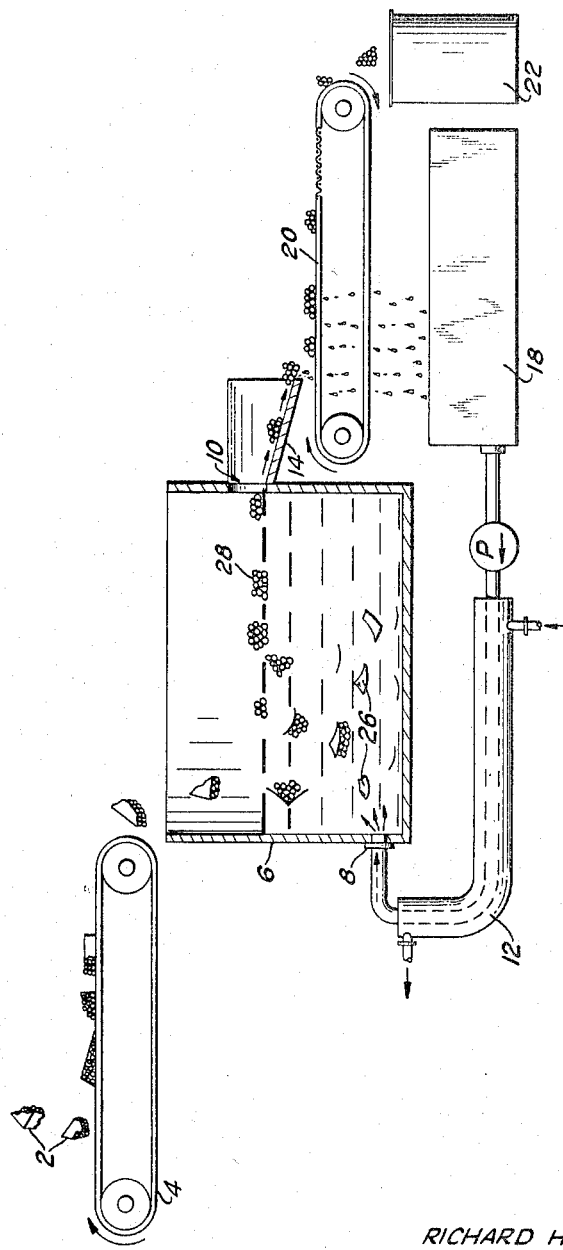

3,284,282
APPARATUS FOR RECOVERING EXPANDABLE POLYSTYRENE FROM WASTE PAPER FOAM MATERIALS
Richard H. Immel, Sewickley, Pa., assignor to Koppers Company, Inc., a corporation of Delaware
Filed July 11, 1963, Ser. No. 294,305
1 Claim. (Cl. 162—4)

This invention relates to a process and apparatus for recovering expanded polystyrene materials from the waste created during the conversion of high strength, paper-expandable polystyrene laminates into packaging materials.

The box-making and container-manufacturing industry is in the process of substituting revolutionary materials for corrugated paper in producing containers for special uses, e.g., uses wherein impact-resistance and resistance to varying moisture changes are necessary. Thus, the use of expanded polystyrene foam as a core material in the manufacture of high strength paper laminates from which containers or boxes are to be made has reached significant commercial success.

In the preparation of containers from materials containing expanded polystyrene as a core, considerable waste or scrap results from startups, trimming, die-cutting, and the like. Great quantities of foam core paperboard are used in preparing containers and boxes and the average corrugator and containers plants currently operate at a waste level of about 15–20 percent. The container-manufacturing industry is extremely desirous of utilizing the expanded polystyrene material recoverable from the waste in a form as nearly as possible as the original raw material.

The basic raw material for the expanded polystyrene foam is expandable styrene polymer particles or pellets which have successfully been applied in many different fields to demonstrate their unique versatility. Expandable styrene polymer particles and pellets have, for example, been used for low temperature insulation is refrigeration, in flotation equipment, in housing construction, in preparing foams useful for hot or cold containers and the like.

It is in these areas that it has been recognized that great use could be made of recovered waste expanded polystyrene if an economical process for recovering said waste could be devised.

The expandable polystyrene foam paper surface materials used in preparing cartons from which waste materials are obtained or prepared by a number of well-known commercial methods. One method for example involves coating pre-expanded expandable polystyrene with a high loss factor material and disposing said materials evenly between paper such as kraft paperboard facing materials. The facing materials, e.g., kraft paperboard, having expandable polystyrene interposed therebetween are passed through a field of high-frequency waves generated in a manner to cause a dielectric heating of the high power loss factor covering the expandable polystyrene particles. There is then a comitant expansion of the particles into an integral cellular structure which becomes affixed to the facing material. The facing material containing cellular structure is thereafter cooled to cause the plastic to become rigid, thereby forming the high-strength paper-expandable polystyrene laminates. These materials are then cut and scored and formed into the shape of cartons or containers for varying uses.

In accordance with this invention, waste materials comprised of expanded polystyrene foam contained within paperboard surfaces are rendered utilitarian by immersing said paperboard-expanded polystyrene foam waste in hot water for a short period of time to thereby separate the paper material from the expanded polystyrene core material and then removing the separated foamed polystyrene from said hot water.

By using the novel process of this invention there can be obtained particles of expandable polystyrene substantially in their basic raw material form.

The expanded polystyrene particles thus produced are usable either separately or in combination with fresh expandable polystyrene to make other products which are suitably prepared from expandable polystyrene foam materials. Thus, the recovered raw material foam polystyrene may be charged into a closed mold and heat and pressure applied thereto to produce a board-like or other configurated structure. Also, the recovered polystyrene materials can be pelletized, that is, charged into the hopper of an extruder and additional expanding agent impregnated therein and ejected therefrom in the shape of a rod which is subsequently cut into the form of pellets. The expanding agent can be conveniently added in accordance with the method described in co-pending application Serial No. 21,675 and now abandoned. The pelletized material can be conventionally extruded, blow molded or thermo-formed into shaped foamed objects. For example, the pellets may be used in an extruder and extruded into the form of a blown or expanded polystyrene film such as that described in U.S. Patent No. 2,941,964, issued June 21, 1960, and assigned to the assignee of this invention, and after extrusion into the shape of a film, further processed by such means as vacuum forming into a variety of shaped articles. An example of extrusion and vacuum forming techniques is described in U.S. Patent No. 3,039,911, assigned to the assignee of this invention.

The recovered polystyrene materials may also be mixed with fresh expandable polystyrene and used to produce articles according to the above-described processes. The mixture of the recovered waste material with fresh expandable polystyrene would in some instances provide a more cohesively formed end product due to the greater expanding power of fresh expandable polystyrene.

In each of the above-mentioned processes, the waste material or mixtures of waste and fresh expandable polystyrene are softened by the application of heat in excess of the incipient softening point of the polymeric materials. The heat causes the expansion softening and coherence of the expandable materials to one another and upon cooling a shaped formed object or an extruded formed material is obtained.

I have found in the practice of this invention that the waste materials to be separated may have a residence time in the hot water of from about 20 seconds to about 120 seconds. The temperature of the hot water into which the waste materials are placed may range from 150° to about 250° F. Under these conditions, separation of the paper from the expanded polystyrene material is readily accomplished. To facilitate this separation, if desired, wetting agents may be added to the water to enhance the absorption of water into the paper materials thus causing them to separate and flow to the bottom level of the water in rapid fashion. For example, such wetting agents as di(2-ethylhexyl)ester of sodium sulfosuccinic acid, sodium alkylnaphthalene-sulfonate, sodium allylsulfate, sodium dibutylnapthalenesulfonate, isopropylated naphthalenesulfonic acid, butylated naphthalenesulfonic acid (Na salt), propylated naphthalenesulfonic acid (Na salt), and the like may be conveniently used to enhance the absorption of water into the paper.

The single sheet of drawing is a diagrammatic representation of the practice of the invention and an apparatus for practicing the invention.

Waste sections of paper-expanded polystyrene foamed laminates 2 are fed onto a continuous moving belt 4. The belt 4 is situated in a position above water tank 6 so as to feed the laminates continually into tank 6. The waste materials 2 are fed from the belt 4 into water tank 6. Water tank 6 is equipped with entry port 8 for the purpose of admitting heated water thereto and exit 10 for continually discharging water therefrom during the separation process. Tank 6 is further equipped with heater 12 to preheat said water admitted into tank 6. Upon immersion of said waste laminated materials 2 into the water contained in tank 6, the laminated materials 2, due to the action of the heated water separate. The paper portions of the laminate 26, because of their water absorption and density properties, rapidly sink to the bottom of said tank. The emancipated polystyrene materials, because of their well-known buoyancy characteristics, stay afloat on the top of the liquid level contained in tank 6 and because of the continuing flow of water from entry port 8 through exit 10, are discharged with the water flow through exit 10 onto spout 14. Spout 14 conveys the discharged water and emancipated polystyrene materials onto a continually moving porous screen 20, through which the discharged water drains. The draining water is collected into collecting tank 18 while simultaneously said polystyrene materials are carried on belt 20 and discharged therefrom into a collecting container 22. The discharged water which passed through porous screen 20 flows from collecting tank 18 through heater 12 to be recirculated to tank 6 for continued use in separating the waste material.

The expanded polystyrene materials collected in collecting tank 22 may then be stored prior to further processing or used immediately to produce foamed shaped objects.

The foregoing has presented a novel method and apparatus for separating expanded polystyrene materials from waste paper-expanded polystyrene laminates which separated expanded material can be further expanded under heat and pressure to produce foamed polymeric structures of varying dimensions and configuration.

I claim:

An apparatus for the treatment of paper-expanded polystyrene waste laminates whereby the paper in said laminates is separated from the expanded polystyrene comprising a tank, a conduit leading to said tank for feeding water to said tank, a heater for heating said water in said conduit, a movable conveyor belt positioned above the liquid level in said tank for feeding waste laminates such that said laminates are introduced into the water in said tank whereby the paper in said waste laminates becomes separated from said expanded polystyrene, said tank including a discharge port remote from said movable conveyor belt for continually discharging water from said tank at the liquid level in said tank whereby said separated expanded polystyrene which floats in said water is discharged with said water through said port, a screened conveyor belt located adjacent to and below said port for separating said expanded polystyrene from said water, a spout attached to said discharge port for directing said water containing separated expanded polystyrene to said screened conveyor belt, a collecting tank to receive said separated water and a conduit between said collecting tank and said water tank to continually recycle said removed water through said heater to said water tank.

References Cited by the Examiner
UNITED STATES PATENTS

| | | | |
|---|---|---|---|
| 1,245,839 | 11/1917 | Waring | 162—5 |
| 2,614,922 | 10/1952 | Hope | 162—5 |
| 3,061,007 | 10/1962 | Rich | 162—242 X |

DONALL H. SYLVESTER, *Primary Examiner.*

HOWARD R. CAINE, *Examiner.*